(12) United States Patent
Dai

(10) Patent No.: US 11,263,345 B2
(45) Date of Patent: Mar. 1, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Jiahao Dai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 167 days.

(21) Appl. No.: 16/372,419

(22) Filed: Apr. 2, 2019

(65) Prior Publication Data

US 2019/0317983 A1  Oct. 17, 2019

(30) Foreign Application Priority Data

Apr. 13, 2018  (JP) .............................. JP2018-077968

(51) Int. Cl.
| | |
|---|---|
| *G06F 21/62* | (2013.01) |
| *G06F 40/197* | (2020.01) |
| *G06F 40/166* | (2020.01) |
| *G06F 40/194* | (2020.01) |

(52) U.S. Cl.
CPC ........ *G06F 21/6254* (2013.01); *G06F 40/166* (2020.01); *G06F 40/194* (2020.01); *G06F 40/197* (2020.01)

(58) Field of Classification Search
CPC .. G06F 21/6254; G06F 40/197; G06F 40/166; G06F 40/194
See application file for complete search history.

(56) References Cited

U.S. PATENT DOCUMENTS

| | | | |
|---|---|---|---|
| 7,640,158 B2 | 12/2009 | Detlef et al. | |
| 8,086,453 B2 | 12/2011 | Detlef et al. | |
| 8,666,742 B2 | 3/2014 | Detlef et al. | |
| 9,817,805 B1* | 11/2017 | Markman | ............... G06Q 10/10 |
| 10,127,212 B1* | 11/2018 | Kim | ...................... G06F 40/279 |
| 2005/0210392 A1* | 9/2005 | Koide | ................... G06F 40/169 715/751 |
| 2008/0172607 A1* | 7/2008 | Baer | ..................... G06F 40/166 715/255 |
| 2012/0284344 A1* | 11/2012 | Costenaro | ............. G06F 40/169 709/206 |

(Continued)

FOREIGN PATENT DOCUMENTS

| | | |
|---|---|---|
| JP | 2006276912 | 10/2006 |
| JP | 2009515253 | 4/2009 |
| JP | 2013242688 | 12/2013 |

*Primary Examiner* — Keith D Bloomquist
(74) *Attorney, Agent, or Firm* — JCIPRNET

(57) ABSTRACT

An information processing apparatus includes an acquiring unit, an identifying unit, an extracting unit, and a notifying unit. The acquiring unit acquires a document designated by a user. The identifying unit identifies a first disclosure range of the document. The extracting unit extracts an expression change previously made to accommodate a disclosure range change from the first disclosure range to a second disclosure range, the expression change being stored in a storage unit. The notifying unit notifies, if the document includes an expression before the expression change, the user of the expression change.

10 Claims, 9 Drawing Sheets

(56) References Cited

U.S. PATENT DOCUMENTS

| | | | | |
|---|---|---|---|---|
| 2014/0258228 A1* | 9/2014 | Bhide | ............... | G06F 40/197 707/625 |
| 2014/0365579 A1* | 12/2014 | Thrasybule | ........... | G06F 40/197 709/205 |
| 2015/0256491 A1* | 9/2015 | Eatough | ............... | G06Q 10/107 709/206 |
| 2017/0083871 A1* | 3/2017 | Chang | ................... | G06F 16/93 |
| 2017/0205965 A1* | 7/2017 | Goel | ................... | G06Q 10/103 |
| 2019/0303089 A1* | 10/2019 | Mukherji | ............ | G06F 3/04847 |

\* cited by examiner

FIG. 4

| BEFORE CHANGE | AFTER CHANGE | OLD DISCLOSURE RANGE | NEW DISCLOSURE RANGE |
|---|---|---|---|
| CHEMICAL HEAVY INDUSTRIES ABC CORPORATION | CHEMICAL MANUFACTURER | userA | userC |
| CHEMICAL HEAVY INDUSTRIES ABC CORPORATION | CORPORATION A | userD | userG |
| CHEMICAL HEAVY INDUSTRIES ABC CORPORATION | CHEMICAL HEAVY INDUSTRIES XXX | userE | userH |
| CHEMICAL HEAVY INDUSTRIES ABC CORPORATION | | userF | userJ |
| 232,189 YEN SALES | 3x INCREASE FROM PREVIOUS YEAR | userA | userC |
| 232,189 YEN SALES | APPROX. 230,000 YEN | userD | userG |
| TANAKA, GENERAL MANAGER OF PLANNING AND DEVELOPMENT DIVISION | SUZUKI, GENERAL MANAGER OF PLANNING AND DEVELOPMENT DIVISION | userA | userB |
| TOKYO CENTRAL BRANCH | BRANCH A | userA | userC |
| YOKOHAMA BRANCH | BRANCH B | userA | userC |
| OSAKA BRANCH | BRANCH C | userA | userC |
| NAGOYA BRANCH | BRANCH D | userA | userC |
| SHONAN BRANCH | BRANCH F | userA | userC |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-077968 filed Apr. 13, 2018.

BACKGROUND

(i) Technical Field

The present disclosure relates to information processing apparatuses, information processing systems, and non-transitory computer readable media.

(ii) Related Art

Japanese Unexamined Patent Application Publication No. 2006-276912 discloses a document editing apparatus, a computer program, and a document editing method that flexibly and readily perform a confidential editing process in accordance with the contents of a document. A confidential editing process involves, for example, replacing a part of text (e.g., a specific word or phrase, a proper noun, or a numerical value) with another phrase so as to hide confidential information when disclosing a document.

Japanese Unexamined Patent Application Publication No. 2013-242688 discloses a data output apparatus, a data output method, and a program that flexibly cope with a non-disclosure section when outputting a structural document that contains non-disclosure information.

PCT Japanese Translation Patent Publication No. 2009-515253 discloses a correction system that observes a difference between a draft document and a corresponding edited document so as to extract an editing pattern and derive a correction rule from the pattern.

SUMMARY

It is often necessary to change expressions of elements (such as words, phrases, proper nouns, and numerical values) in a document depending on the disclosure range of the document. However, searching for expressions appropriate for different disclosure ranges in view of previous examples is time-consuming and troublesome.

Aspects of non-limiting embodiments of the present disclosure relate to using a previous example of a document approved for disclosure by changing an expression when changing the disclosure range of the document so as to give a suggestion about an expression to be changed to a user who is trying to newly change the disclosure range.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the disclosure, there is provided an information processing apparatus including an acquiring unit, an identifying unit, an extracting unit, and a notifying unit. The acquiring unit acquires a document designated by a user. The identifying unit identifies a first disclosure range of the document. The extracting unit extracts an expression change previously made to accommodate a disclosure range change from the first disclosure range to a second disclosure range, the expression change being stored in a storage unit. The notifying unit notifies, if the document includes an expression before the expression change, the user of the expression change.

BRIEF DESCRIPTION OF THE DRAWINGS

An exemplary embodiment of the present disclosure will be described in detail based on the following figures, wherein:

FIG. 4 illustrates an example of change information stored in a storage unit of the service apparatus;

FIG. 5 illustrates an example of a document based on which a new document is created based on;

DETAILED DESCRIPTION

An exemplary embodiment of the present disclosure will be described below with reference to the drawings.

Exemplary Embodiment

Overall Configuration

Figure 1:
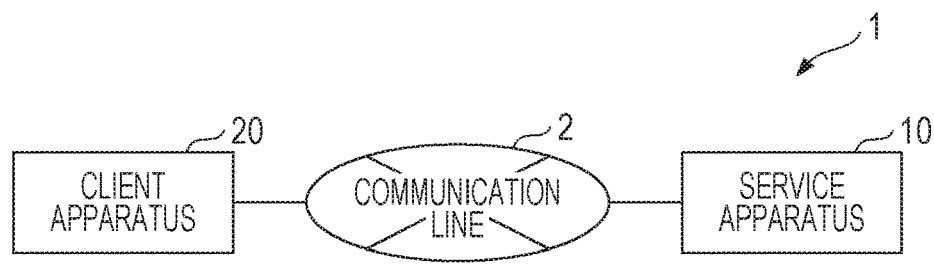
FIG. 1 illustrates an example of the overall configuration of an information processing system according to an exemplary embodiment of the present disclosure.

FIG. 1 illustrates an example of the overall configuration of an information processing system 1 according to an exemplary embodiment of the present disclosure. The information processing system 1 provides, for example, a document-related service to a user using a client apparatus 20.

A communication line 2 serves as a means of data communication. The communication line 2 is connected to a plurality of computers that perform data communication. The communication line 2 may be wired or wireless. As shown in FIG. 1, in this exemplary embodiment, the communication line 2 is connected to a service apparatus 10 and the client apparatus 20.

In this exemplary embodiment, the client apparatus 20 is a computer having a document viewer function and a document editing function. A specific example of the client apparatus 20 includes a personal computer in which software for viewing a document (e.g., viewer software) and software for editing a document (e.g., editor software) are installed. The personal computer has a display (e.g. a liquid crystal display) and an operating part (e.g. a button, a keyboard, a mouse, a touchscreen) that accepts various commands from a user of the client apparatus 20. Although FIG. 1 has only one client apparatus 20 for the purpose of simplification, more than one client apparatus 20 may be connected to the communication line 2 in this exemplary embodiment. The information processing system 1 may be a system that provides a document-related service to employees of different corporations. In such a case, client apparatuses 20 of employees of different corporations are connected to the communication line 2.

The service apparatus 10 is an information processing apparatus according to an exemplary embodiment of the present disclosure and provides the document-related service to the user using the client apparatus 20. For example, the service apparatus 10 provides the user using the client apparatus 20 with a document management service for managing (e.g., storing, distributing, deleting) document data indicating a document. The document data is distributed only to a user authorized to view or edit the document indicated by the document data. Accordingly, the service apparatus 10 is capable of disclosing the document only to a user authorized to view or edit the document.

Furthermore, the service apparatus 10 provides, to the user using the client apparatus 20, an editing assistance service that assists the user to change an element (such as a word, a phrase, a proper noun, or a numerical value) in the document in accordance with a change of disclosure range (disclosure range change) of the document. Examples of a change of disclosure range include giving an employee of Corporation B a right to access an internal document of Corporation A, and sharing a document already shared within a certain department in Corporation A with another department in the same corporation. A disclosure range change does not necessarily increase the size of a disclosure range; it may also reduce the size of a disclosure range. One example of a disclosure range change that reduces the size of a disclosure range is restricting a disclosure range of a document originally created for managers to "Executives Only". A document used within a corporation may include an element that must not be disclosed outside the intended disclosure range of the document, such as an element confidential to a corporation or a department. Therefore, when the disclosure range expands, an expression of such an element may have to be changed for confidentiality or other reasons. When the disclosure range shrinks, an element expressed by a generic term for confidentiality may be expressed by a more specific term. The editing assistance service helps the user to make such changes more easily than in the related art. The service apparatus 10 may provide not only the above-described service but also other services.

In this exemplary embodiment, a user needs to be authenticated by the service apparatus 10 using a service provided by the service apparatus 10. The service apparatus 10 stores user information used for authenticating a user permitted to use the service provided by the service apparatus 10, and authenticates the user by using user information received from the client apparatus 20. An example of the user information includes a combination of a user identifier and a password, wherein the user identifier identifies the user operating the client apparatus 20. Specific examples of the user identifier include an electronic mail address and a user ID allocated to the user. If the user at the client apparatus 20 is authenticated by the service apparatus 10, the user may use the service provided by the service apparatus 10. If the user is not authenticated by the service apparatus 10, the user may not use the service provided by the service apparatus 10.

Configuration of Service Apparatus 10

Figure 2:
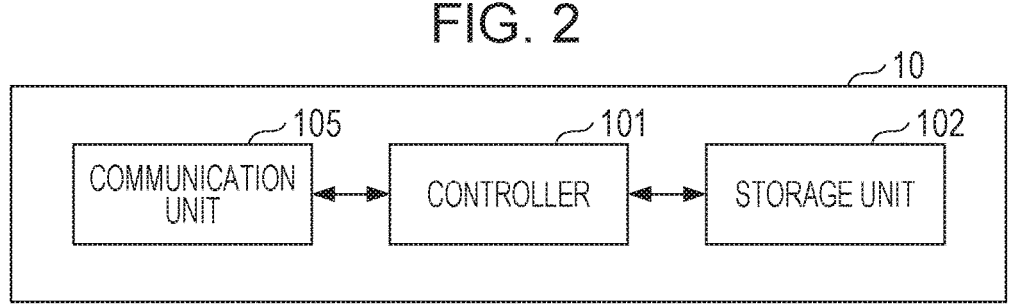
FIG. 2 illustrates an example of a hardware configuration of a service apparatus.

FIG. 2 is a block diagram illustrating an example of a hardware configuration of the service apparatus 10. As shown in FIG. 2, the service apparatus 10 includes a controller 101, a storage unit 102, and a communication unit 105. The communication unit 105 functions as a communication interface for data communication and is connected to the communication line 2.

The storage unit 102 includes a device (such as a hard disk device) that permanently stores, for example, a program to be executed by the controller 101 and a table that contains information used to provide the document-related service. Specific examples of the program stored in the storage unit 102 include a program of an operating system, a program for providing the document management service, a program for providing the editing assistance service, and a program for authenticating a user who wants to use the editing assistance service.

Specific examples of the information stored in the storage unit 102 include user information indicating a user permitted to use the service provided by the service apparatus 10, document data indicating a document the user is authorized to view or edit, and change information that is referred to and updated as the aforementioned editing assistance service is provided. The process information will be described in detail later.

The controller 101 has a central processing unit (CPU), a read-only memory (ROM), and a random access memory (RAM), and executes the program stored in the storage unit 102 so as to control the storage unit 102 and the communication unit 105. The controller 101 executes the program so that, for example, a function related to the document management service, a function related to the editing assistance service, and a user authenticating function are realized. In addition to or as an alternative to the CPU, the controller 101 may have, for example, a dedicated processor.

Figure 3:
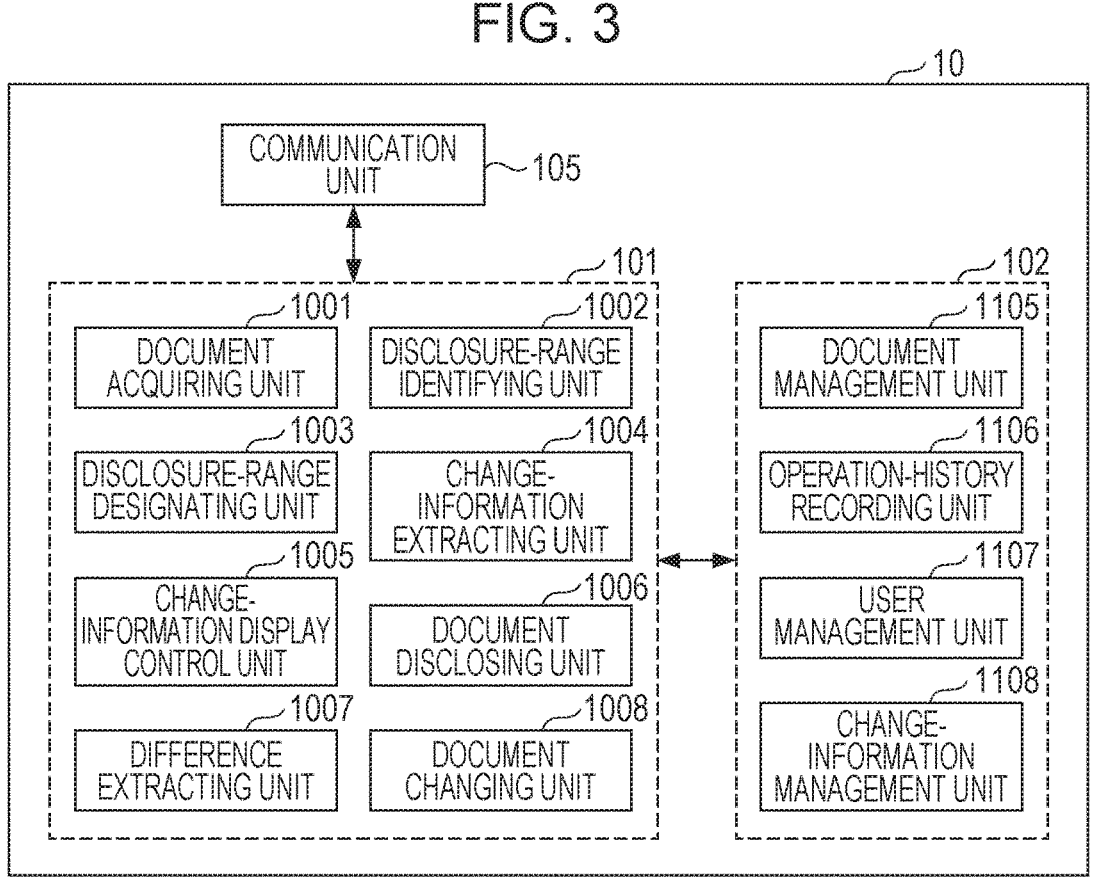
FIG. 3 is a block diagram illustrating a functional configuration of the service apparatus.

FIG. 3 is a functional block diagram illustrating the configuration of functions of the service apparatus 10 that are related to the present disclosure. Of the functional blocks shown in FIG. 3, a document management unit 1105, an operation-history recording unit 1106, a user management unit 1107, and a change-information management unit 1108 are realized by the storage unit 102. On the other hand, a document acquiring unit 1001, a disclosure range identifying unit 1002, a disclosure-range designating unit 1003, a change-information extracting unit 1004, a change-information display control unit 1005, a document disclosing unit 1006, a difference extracting unit 1007, and a document changing unit 1008 are realized by the controller 101 operating in accordance with the program.

The document management unit 1105 records document data indicating a document that may be viewed and/or edited via the information processing system, in relation with authorization information that indicates the user who created the document and the user(s) to whom the document is disclosed (disclosure range of the document). A specific example of the authorization information includes user identifiers for identifying the user who created the document and the disclosure range of the document. The operation-history recording unit 1106 stores records of changes that have been made to the document. The user management unit 1107 stores user information indicating a user permitted to use the information processing system 1.

The change-information management unit 1108 stores change information for each document (see FIG. 4). The change information contains expressions used for an old disclosure range and a new disclosure range (i.e., before and after of an element), a user identifier that identifies the old disclosure range, and information indicating the new disclosure range (see FIG. 4). An example of the information indicating the new disclosure range includes a user identifier that identifies a user in the new disclosure range. For example, the first row of change information shown in FIG. 4 indicates that the element "Chemical Heavy Industries ABC Corporation" included in a document before a change of the disclosure range was changed to "Chemical Manufacturer", the old disclosure range of the document was the user identified by the user identifier "userA", and the new disclosure range of the document was the user identified by the user identifier "userC". The forth row of change information shown in FIG. 4 does not have the "after" of an element, indicating that the element was deleted.

When the controller 101 is accessed from a user at the client apparatus 20 via the communication unit 105, the controller 101 authenticates the user. When the authentication is successful, the controller 101 causes the client apparatus 20 to display a list of titles of documents the user is authorized to view and/or edit, and prompts the user to select a document the user wants to view or edit. Document data of the documents are stored in the document management unit 1105. The user selects a document he/she wants to view or edit by operating an operating part (not shown) of the client apparatus 20 (e.g., clicking a mouse). The operation performed by the user is transmitted to the controller 101 via the communication line 2 and the communication unit 105. The document acquiring unit 1001 acquires, from the document management unit 1105, document data indicating the document designated by the user. The document acquiring unit 1001 is an example of an acquiring unit that acquires a document designated by a user.

Furthermore, when the document is designated by the operation performed on the client apparatus 20, the controller 101 causes the client apparatus 20 to display a drop-down list that allows the user to select between "View" and "Edit". The user operates an operating part of the client apparatus 20 to select "Edit" from the drop-down list. The operation performed by the user is transmitted to the controller 101 via the communication line 2 and the communication unit 105. In response to the operation, the disclosure-range designating unit 1003 causes the client apparatus 20 to display a disclosure-range designation screen that prompts the user to input a user identifier or user identifiers of a new disclosure range. The disclosure-range designating unit 1003 receives an input from the user, and acquires the user identifier(s) provided on the disclosure range designation screen as information indicating its new disclosure range. The disclosure-range designating unit 1003 is an example of a receiving unit that receives designation of a disclosure range from a user.

The disclosure range identifying unit 1002 identifies the current disclosure range of the document acquired by the document acquiring unit 1001, by searching the document management unit 1105 for authorization information stored in relation with the document data indicating the document. The disclosure range identifying unit 1002 is an example of an identifying unit that identifies a disclosure range to which a document is currently disclosed.

The change-information receiving unit 1004 receives, from the change-information management unit 1108, change information of the "before" of an element that was changed when the disclosure range of the document was changed from the same disclosure range as the current disclosure range identified by the disclosure range identifying unit 1002. The change-information receiving unit 1004 is an example of a receiving unit that receives an expression changed when a document disclosed in a specified range is to be disclosed in a range different from the specified range.

The change information display control unit 1005 causes the client apparatus 20 to display a change recommendation (i.e., an option to which the element is changeable) for an element that may have to be changed to make the element more suitable to the new disclosure range. The document disclosing unit 1006 changes a disclosure range of a document, provides a notification to a user who became part of the disclosure range after the disclosure range change, and discloses the document to the user who became part of the disclosure range after the disclosure range change.

The difference extracting unit 1007 compares a first document disclosed to a first disclosure range, and a second document created based on the first document and disclosed to a second disclosure range, extracts any difference in titles and elements of the first and the second documents, generates change information based on the extracted difference, and registers the change information in the change-information management unit 1108.

The document changing unit 1008 changes an element in the document in accordance with the change information extracted by the change-information extracting unit 1004, so as to generate a new document.

The configuration of the service apparatus 10 has been described above. Specifically, the change-information display control unit 1005 is an example of a notifying unit that notifies a user of an extracted expression in which an expression before or after a change is included in a document.

Figure 5:
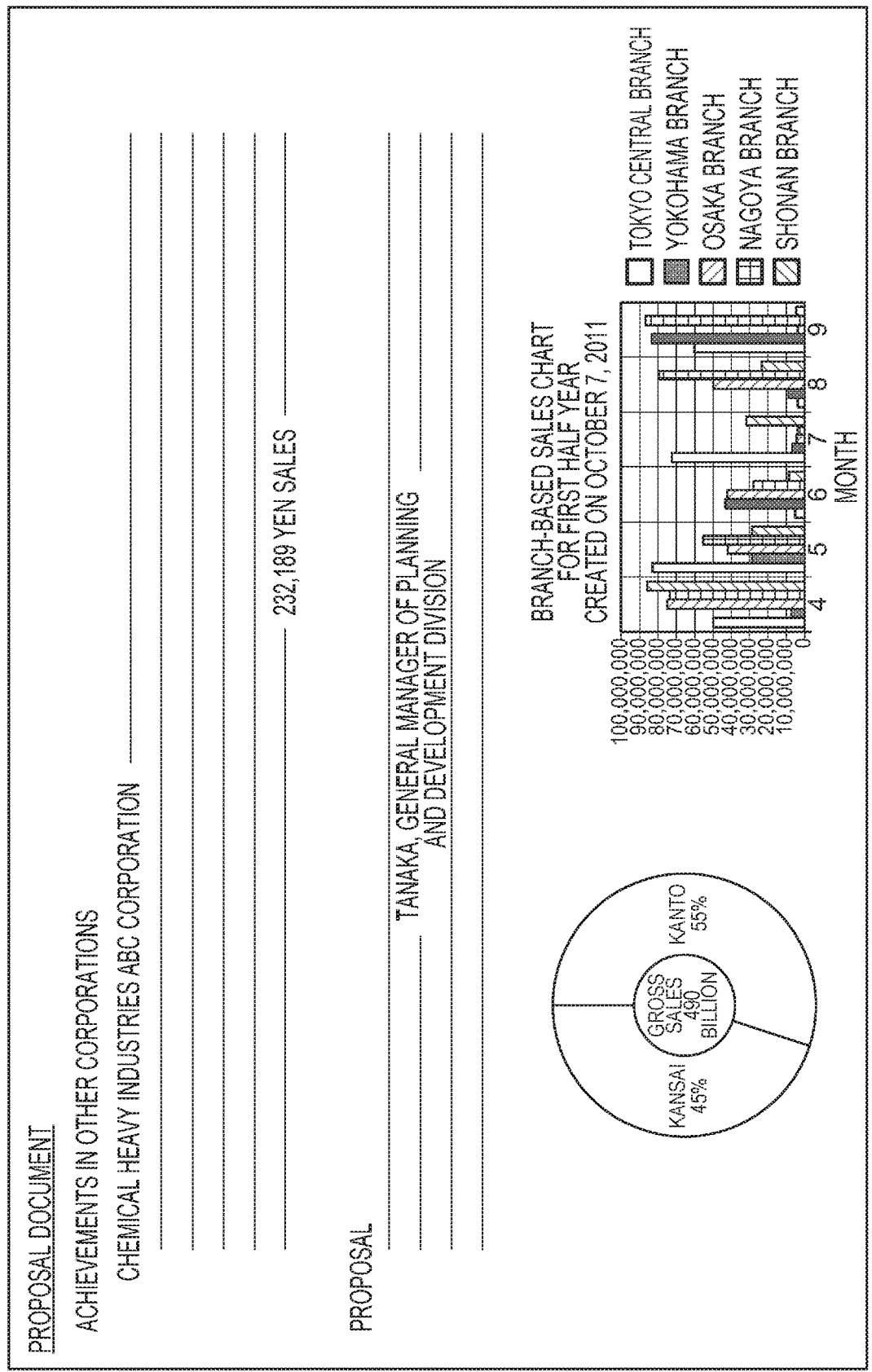

Now, the operation of the service apparatus 10 is described using an example case where a user A creates a document Y based on a document X. The document X (see FIG. 5) is a private document created by the user A corresponding to the user identifier "userA". The document Y is a document to be disclosed to a user B corresponding to the user identifier "userB", who is an employee of a different corporation. In the following operation example, the change information shown in FIG. 4 is already stored in the change-information management unit 1108 of the service apparatus 10.

As described already, in response to a user access from the client apparatus 20 via the communication unit 105, the controller 101 authenticates the accessing user. If the authentication is successful, the controller 101 causes the client apparatus 20 to display a list of titles of documents the user is authorized to view and/or edit, and prompts the user to select a document the user wants to view or edit. Document data of the documents are stored in the document management unit 1105. If the accessing user is the user A who created the document X, the user A is authorized to view and edit the document X. Therefore, the document X is listed on the display of the client apparatus 20, and by operating the operating unit of the client apparatus 20, the user A designates the document X as a document he/she wants to view and/or edit. The document acquiring unit 1001 acquires, from the document management unit 1105, document data of the document X designated by the user A.

Furthermore, the user A selects "Edit" from the drop-down list displayed on the client apparatus 20. In response to the selection, the disclosure range designation screen is displayed on the client apparatus 20. From the disclosure range designation screen, the user A provides the user identifier of the user B as a new disclosure range. The disclosure-range designating unit 1003 receives the user identifier ("userB" in this example) from the client apparatus 20.

Figure 6:
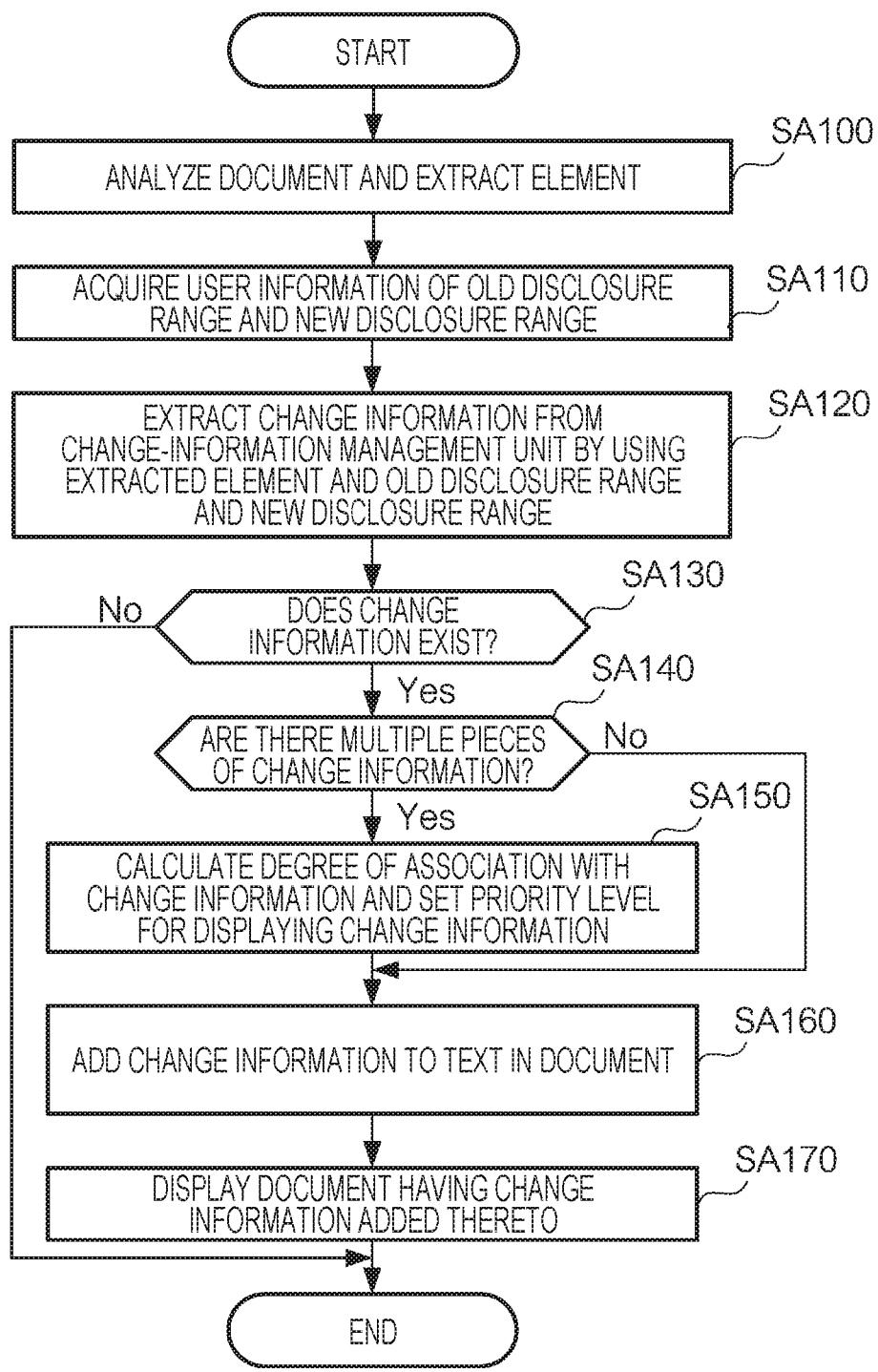
FIG. 6 is a flowchart illustrating the flow of a recommendation process executed by a controller of the service apparatus.

In response to the disclosure range designation, the controller 101 starts a recommendation process shown in FIG. 6. In step SA100 of the recommendation process, the controller 101 first analyzes the document (referred to as "first document" hereinafter) indicated by the document data acquired by the document acquiring unit 1001 and extracts elements in the first document. As mentioned above, the first document in this operational example is the document X shown in FIG. 5. Thus, in this operation example, the elements "Chemical Heavy Industries ABC Corporation", "232,189 Yen sales", "Tanaka, General Manager of Planning and Development Division", "Tokyo Central Branch", "Yokohama Branch", "Osaka Branch", "Nagoya Branch", and "Shonan Branch" are extracted.

In step SA110, the change-information extracting unit 1004 receives the user identifier of the previous disclosure range and the user identifier(s) of the new disclosure range. In this operation example, "userA" is received as the user identifier of the current disclosure range, and "userB" is received as the user identifier of the new disclosure range. In step SA120, the change-information extracting unit 1004 extracts change information from the change-information management unit 1108 by using the elements extracted in step SA100 and the user identifiers of the previous disclosure range and the new disclosure range received in step SA110. More specifically, the change-information extracting unit 1004 extracts, from the change-information management unit 1108, any piece of change information that satisfies at least one of the three conditions below:

(Condition 1) The before-change element is the same as any of the elements extracted in step SA100.
(Condition 2) The old disclosure range is the user A.
(Condition 3) The new disclosure range is the user B.

In this operation example, the change-information in the second to forth, and sixth rows satisfies only the first condition (see FIG. 4). The change information in the first, fifth, and eighth to twelfth rows satisfies the first and second conditions. The change information in the seventh row satisfies all the three conditions. Therefore, all the 12 pieces of change information (information in all the 12 rows) is extracted in this operation example.

In step SA130, the change-information display control unit 1005 determines whether or not any piece of change information has been extracted in step SA120. If at least one piece of change information is extracted in step SA120, the change-information display control unit 1005 determines that change information exists, whereby a determination result indicating "YES" is obtained in step SA130. In contrast, if no piece of change information has been extracted in step SA120, the change-information display control unit 1005 determines that no change information exists, whereby a determination result indicating "NO" is obtained in step SA130. If the determination result indicates "NO" in step SA130, the change-information display control unit 1005 ends the recommendation process. In contrast, if the determination result indicates "YES" in step SA130, the change-information display control unit 1005 executes step SA140 to step SA170, and then ends the recommendation process. As mentioned above, in this example, 12 pieces of change information have been extracted in step SA120. Therefore, the determination result in step SA130 indicates "YES", and the process from step SA140 and onward is executed.

The process from step SA140 to step SA160 is executed for each element in the document X for which change information has been extracted. Such an element may be referred to as "an element that has change information" hereinafter. In step SA140, the change-information display control unit 1005 determines whether or not a plurality of pieces of change information exist for the element. If there are a plurality of pieces of change information for the element, a determination result indicating "YES" is obtained in step SA140. If there is only one piece of change information for the element, a determination result indicating "NO" is obtained in step SA140. If the determination result indicates "YES" in step SA140, the change-information display control unit 1005 executes step SA150 and subsequently executes step SA160. In contrast, if the determination result indicates "NO" in step SA140, the change-information display control unit 1005 executes step SA160 without executing step SA150.

In this operation example, four pieces of change information have been extracted for the element "Chemical Heavy Industries ABC Corporation" and two pieces of change information have been extracted for the element "232,189 Yen sales". For these elements, the determination result in step SA140 indicates "YES". Thus, step SA150 is executed, and step SA160 is subsequently executed. In contrast, only one piece of change information has been extracted for each of the elements "Tanaka, General Manager of Planning and Development Division", "Tokyo Central Branch", "Yokohama Branch", "Osaka Branch", "Nagoya Branch", and "Shonan Branch". For these elements, the determination result in step SA140 indicates "NO". Thus, the change-information display control unit 1005 executes step SA160 without executing step SA150.

In step SA150, the change-information display control unit 1005 calculates the degree of association between one element and each piece of change information extracted for the element, and determines the priority level of the each piece of change information. When the pieces of change information associated with the element are displayed, the pieces of change information are sorted based on their priority levels. There are various conceivable modes for setting the priority levels including the following:

A first mode including:
setting the highest priority level for a piece of change information satisfying all of the first to third conditions;
setting the second highest priority level for a piece of change information satisfying only the third condition;
setting the third highest priority level for a piece of change information satisfying only the second condition; and
setting the lowest priority level for a piece of change information satisfying only the first condition.

A second mode including:
setting the highest priority level for a piece of change information satisfying only the third condition; setting the second highest priority level for a piece of change information satisfying only the second condition; and
setting the lowest priority level for a piece of change information satisfying only the first condition.

In this exemplary embodiment, the first mode described above is employed.

Among the four pieces of process information that have been extracted for the element "Chemical Heavy Industries ABC Corporation", the piece of process information indicating a change to the element "Chemical Manufacturer"

satisfies the first and second conditions, whereas the other three pieces of change information satisfy only the first condition. Therefore, in this operational example, for the element "Chemical Heavy Industries ABC Corporation", the priority level of the change information indicating the change to the element "Chemical Manufacturer" is set to be the highest. Between the two pieces of change information that have been retrieved for the element "232,189 Yen sales", the piece of change information indicating a change to the element "3× increase from previous year" satisfies the first and second conditions, whereas the other piece of change information satisfies only the first condition. Therefore, in this operational example, for the element "232,189 Yen sales", the priority level of the piece of change information indicating the change to the element "3× increase from previous year" is set to be the highest.

Figure 7:
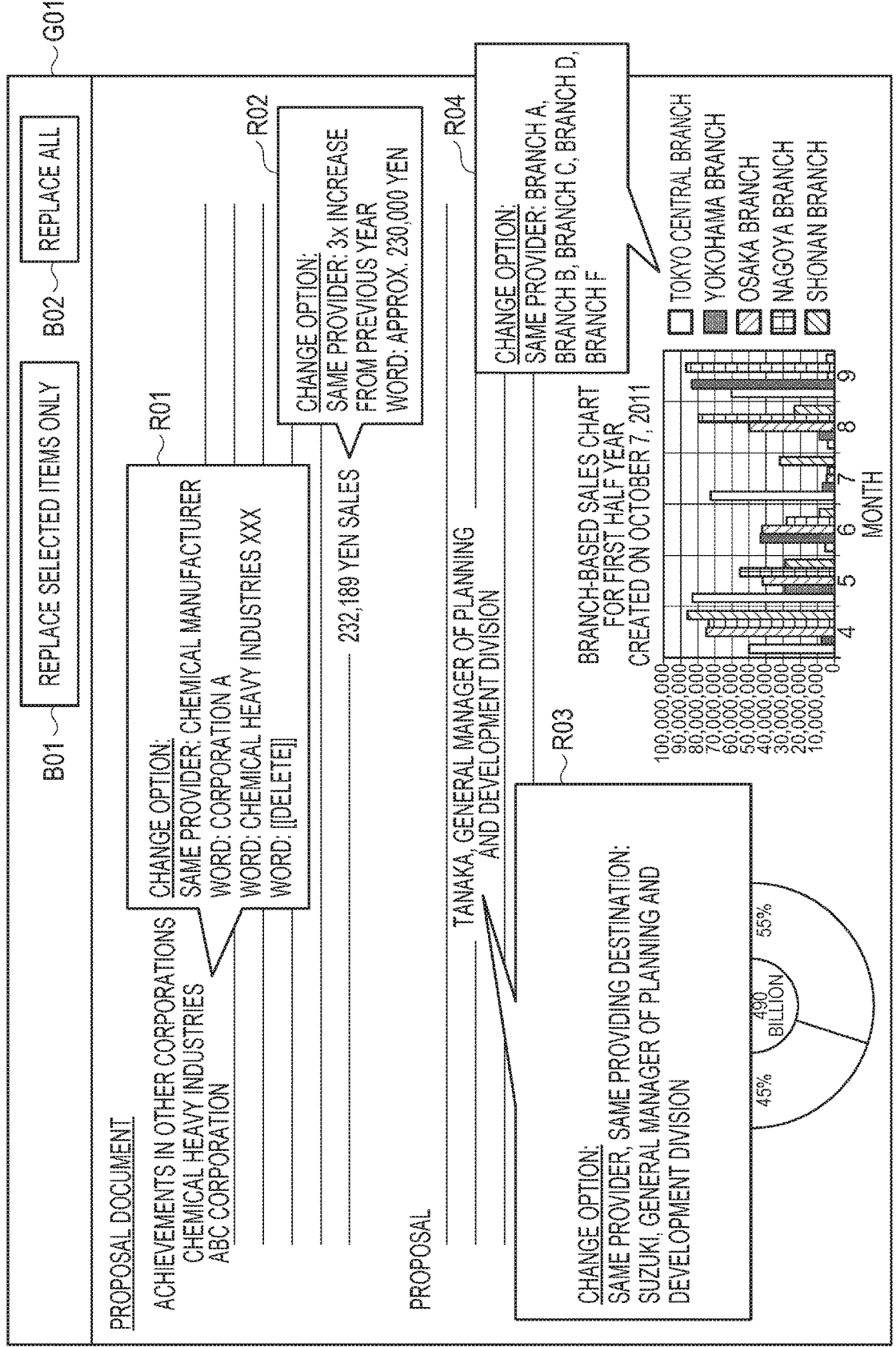
FIG. 7 illustrates an example of an editing screen displayed on a client apparatus as a result of the recommendation process.

In step SA160, the change-information display control unit 1005 adds the one or more extracted pieces of change information to text that includes the element for which the one or more pieces of change information have been extracted (see recommendations R01, R02, R03, and R04 in FIG. 7). For an element with a plurality of pieces of change information, the change-information display control unit 1005 controls one or more of the pieces of information to display in the order of their priority levels determined in step SA150 from the highest. Then, in step SA170, the change-information display control unit 1005 causes the client apparatus 20 to display an editing screen G01 (see FIG. 7) where the document X is displayed with the change information that has been added, and ends the recommendation display process.

FIG. 7 illustrates an example of an editing screen (i.e., the editing screen G01) displayed on the client apparatus 20 as a result of the recommendation process. The editing screen G01 shown in FIG. 7 informs the user A how the elements "Chemical Heavy Industries ABC Corporation", "232,189 Yen sales", "Tanaka, General Manager of Planning and Development Division", "Tokyo Central Branch", "Yokohama Branch", "Osaka Branch", "Nagoya Branch", and "Shonan Branch" were changed when the disclosure range was changed. For an element having a plurality of change options, the change options are displayed in the order of their priority levels from the highest. The change-information display control unit 1005 (an example of the notifying unit) of the service apparatus 10 according to this exemplary embodiment informs a user who is trying to disclose a document to a new disclosure range of an element that may need changing, based on a previous change to an element made and approved when an audience was changed from one audience to another audience. In this exemplary embodiment, the priority levels of the pieces of change information are set in accordance with the degree of association with the process elements. Alternatively, the pieces of change information may be differentiated depending on who made the change indicated by each of the pieces of change information in the past. In this case, a piece of change information corresponding to a change performed in the past by the user himself/herself may be prioritized so that it is displayed at a high position. The notifying unit (i.e., the change-information display control unit 1005) may provide a notification about the pieces of change information of which before-change element is found in the document, in such a manner that the pieces of change information are differentiated by who previously made the change indicated by the pieces of change information.

Instead of sorting the pieces of change information, the priority levels of the pieces of change information may be indicated by changing a text attribute of the pieces of change information depending on their priority levels. Examples of text attribute include font, text color, background color, and text size. This makes it easier for the user to determine whether or not to change an element. Although the change-information extracting unit 1004 extracts change information that satisfies at least one of the first, second, and third conditions in step SA120 of the recommendation display process of the above exemplary embodiment, the change-information extracting unit 1004 may alternatively extract change information that satisfies at least the third condition, thereby informing the user of an expression that may be more suitable for the disclosure range designated by the user.

The editing screen G01 described above includes, for example, a rectangular virtual operating part, such as a button, which the user presses with his/her finger. For example, in a case where a transparent touchscreen is displayed over the display screen of the client apparatus 20, when the user touches an area where a virtual operating part is rendered, the client apparatus 20 detects that an operation for selecting this virtual operator has been performed.

The user A viewing the editing screen G01 shown in FIG. 7 selects a virtual operator B01 or a virtual operating part B02 depending on the element(s) with change information he/she wants to replace. The virtual operating part B02 is used to instruct the service apparatus 10 to replace all, and the virtual operating part B01 is used to instruct the service apparatus 10 to replace only an element or elements selected by the user. When the user A operates the operating unit of the client apparatus 20 to select the virtual operating part B01 or the virtual operating part B02, the operation is transmitted to the controller 101 via the communication line 2 and the communication unit 105, and the controller 101 executes a replacement process shown in FIG. 8.

Figure 8:
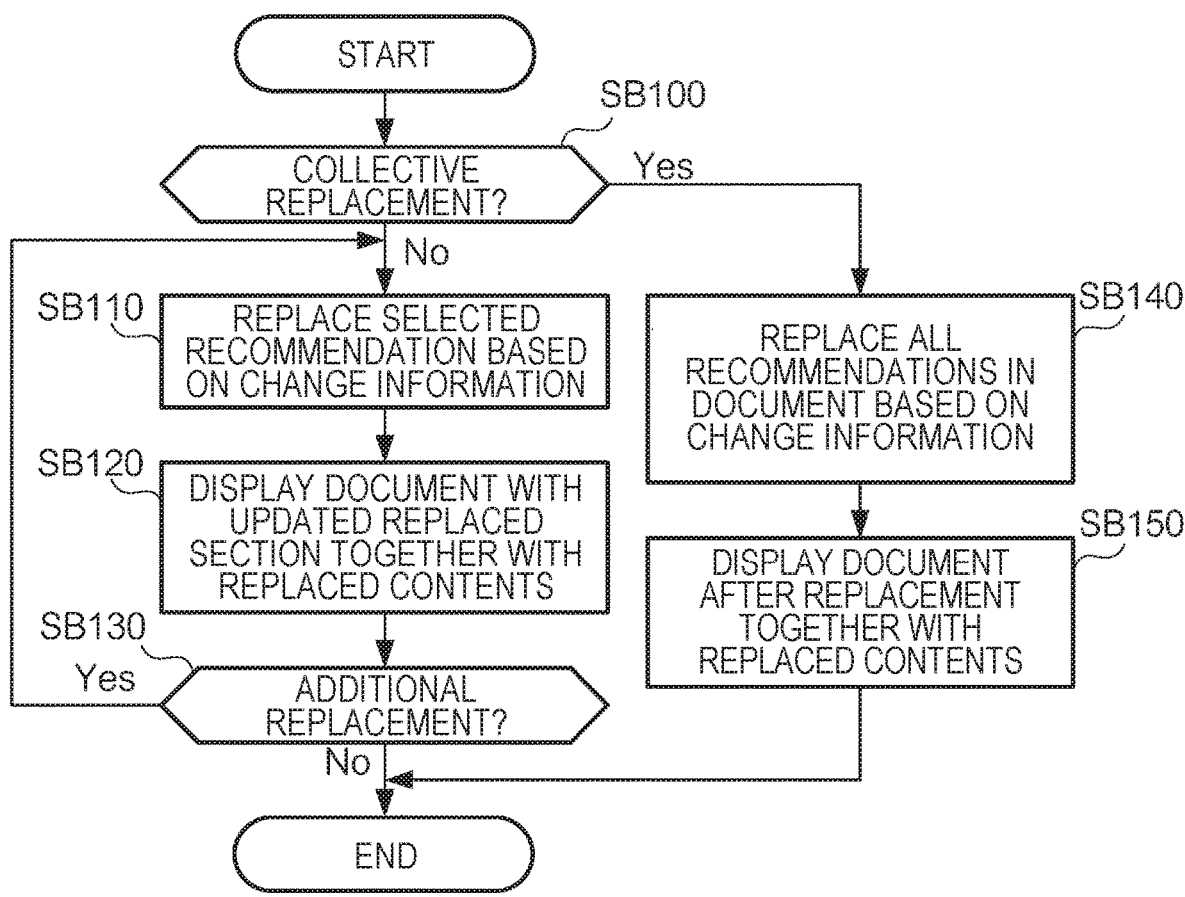
FIG. 8 is a flowchart illustrating the flow of a replacement process executed by the controller of the service apparatus.

In the replacement process shown in FIG. 8, the document changing unit 1008 first determines in step SB100 whether or not all the elements with change information are to be replaced. If selection of the virtual operator B01 is transmitted, the determination result in step SB100 indicates "NO", whereas if selection of the virtual operator B02 is transmitted, the determination result in step SB100 indicates "YES". In the case where the determination result in step SB100 indicates "NO", the document changing unit 1008 executes step SB110 to step SB130. In the case where determination result in step SB100 indicates "YES", the document changing unit 1008 executes step SB140 and SB150.

First, the process from step SB110 to step S130 executed when the determination result in step SB100 indicates "NO" will be described. In the case where the determination result in step SB100 indicates "NO", the document changing unit 1008 first positions a cursor at a recommendation displayed at the top of the editing screen (in this example, recommendation R01 among recommendations R01 to R03), and inquires the user whether or not to replace the element in accordance with the change information of the recommendation. When the user performs an operation to instruct execution of the replacement, the document changing unit 1008 replaces the element based on the change information of the recommendation in step SB110 and displays the first document together with the replaced contents in step SB120. In step SB130, the document changing unit 1008 determines whether or not there is a recommendation to be additionally replaced, that is, an unprocessed recommendation. If the determination result in step SB130 indicates "YES", the document changing unit 1008 executes step SB110 again. If the determination result in step SB130 indicates "NO", the document changing unit 1008 ends the replacement process.

Next, step SB140 and step SB150 executed when the determination result in step SB100 indicates "YES" will be described. In step SB140, the document changing unit 1008 replaces all elements with change information in the document X based on the change information of the recommendations. Specifically, the document changing unit 1008 replaces the elements that have change information in the document X in accordance with the change information for the elements. With regard to an element having a plurality of pieces of change information, the document changing unit 1008 replaces the process element in accordance with the piece of change information with the highest priority level. In step SB150, the document changing unit 1008 displays the document X together with the replaced contents.

With the service apparatus 10 according to this exemplary embodiment, a user who is trying to disclose a document to a new disclosure range may collectively change elements that has change information by selecting the virtual operating part B02.

After the document X has been edited to make it suitable for the new disclosure range (user B), the user A registers the edited document in the document management unit 1105 as a new document Y to be disclosed to the user B and requests an approval of a manager to disclose the document Y to the user B. When the manager approves, the approval is transmitted to the controller 101 via the communication line 2 and the communication unit 105, and the controller 101 executes a difference extraction process shown in FIG. 9.

Figure 9:
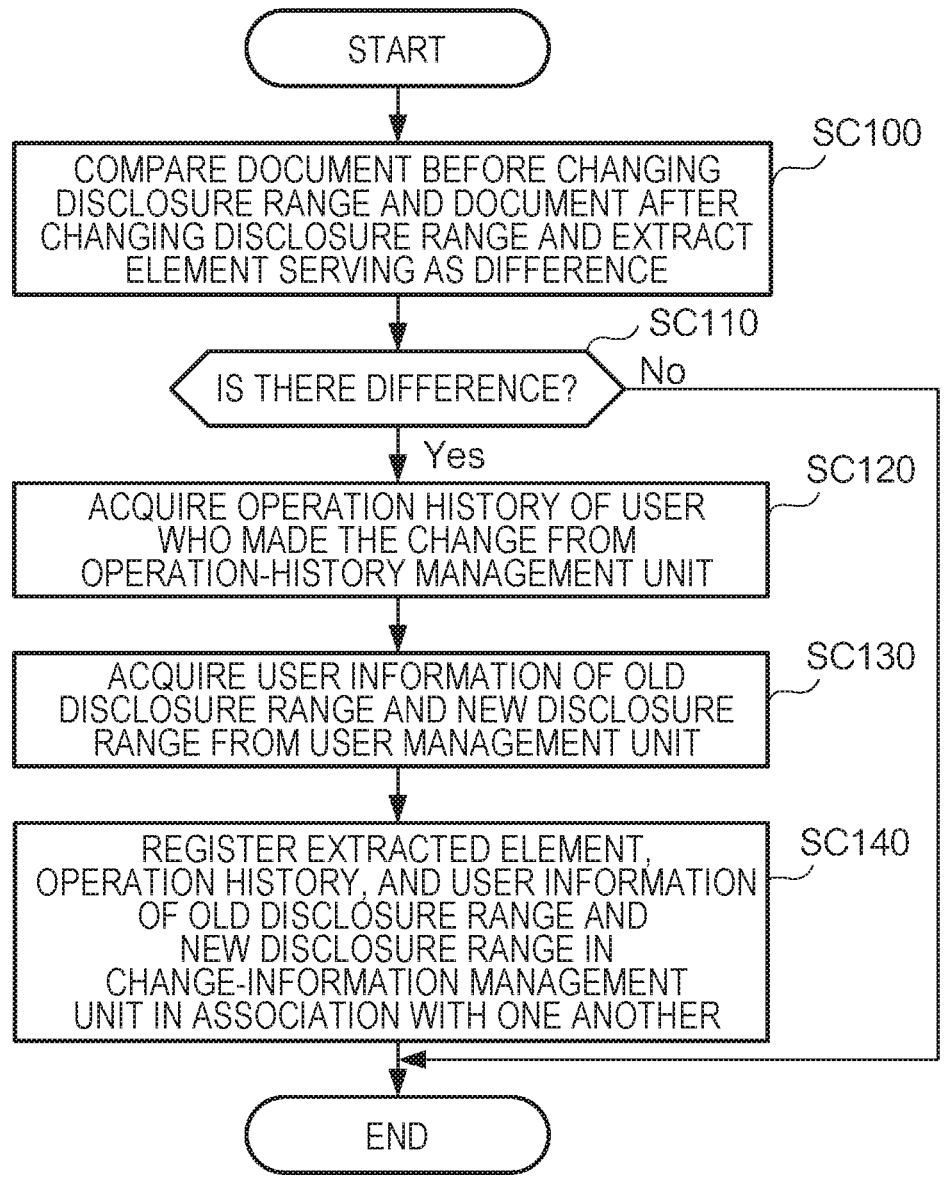
FIG. 9 is a flowchart illustrating the flow of a difference extraction process executed by the controller of the service apparatus.

As shown in FIG. 9, in the difference extraction process, the difference extracting unit 1007 compares the document for the old disclosure range (i.e., the document X in this operational example) with the document for the new disclosure range (i.e., the document Y in this operation example), and extracts a difference in each element in step SC100. In step SC110, the difference extracting unit 1007 determines whether or not there is a difference between the document for the old disclosure range and the document for the new disclosure range. If a difference in an element is extracted in step SC100, the difference extracting unit 1007 determines that there is a difference between the document for the old disclosure range and the document for the new disclosure range, such that the determination result in step SC110 indicates "YES". In contrast, if a difference in an element is not extracted in step SC100, the difference extracting unit 1007 determines that there is no difference between the document for the old disclosure range and the document for the new disclosure range, such that the determination result in step SC110 indicates "NO".

In the case where the determination result in step SC110 indicates "NO", the difference extracting unit 1007 ends the difference extraction process. In contrast, in the case where the determination result in step SC110 indicates "YES", the difference extracting unit 1007 executes step SC120 to step SC140 and ends the difference extraction process. In step SC120, the difference extracting unit 1007 retrieves an operation history of the user who made the change from the operation-history recording unit 1106. In step SC130, the difference extracting unit 1007 acquires user information of the old disclosure range and the new disclosure range from the user management unit 1107. Then, in step SC140, the difference extracting unit 1007 generates new change information by associating (linking) the element extracted in step SC100, the operation history retrieved in step SC120, and the user information of the old disclosure ranges and the user information of the new disclosure range acquired in step SC130, and registers the new change information in the change-information management unit 1108.

The flow of the difference extraction process has been described above.

The new change information registered in the change-information management unit 1108 as a result of the above-described difference extraction process is subsequently used as a previous example of a document that was approved and disclosed with a change to an element that makes the element more suitable for the new disclosure range.

Although an exemplary embodiment of the present disclosure has been described above, the above exemplary embodiment may be modified as follows. Moreover, a plurality of modifications may be combined.

First Modification

Figure 10:
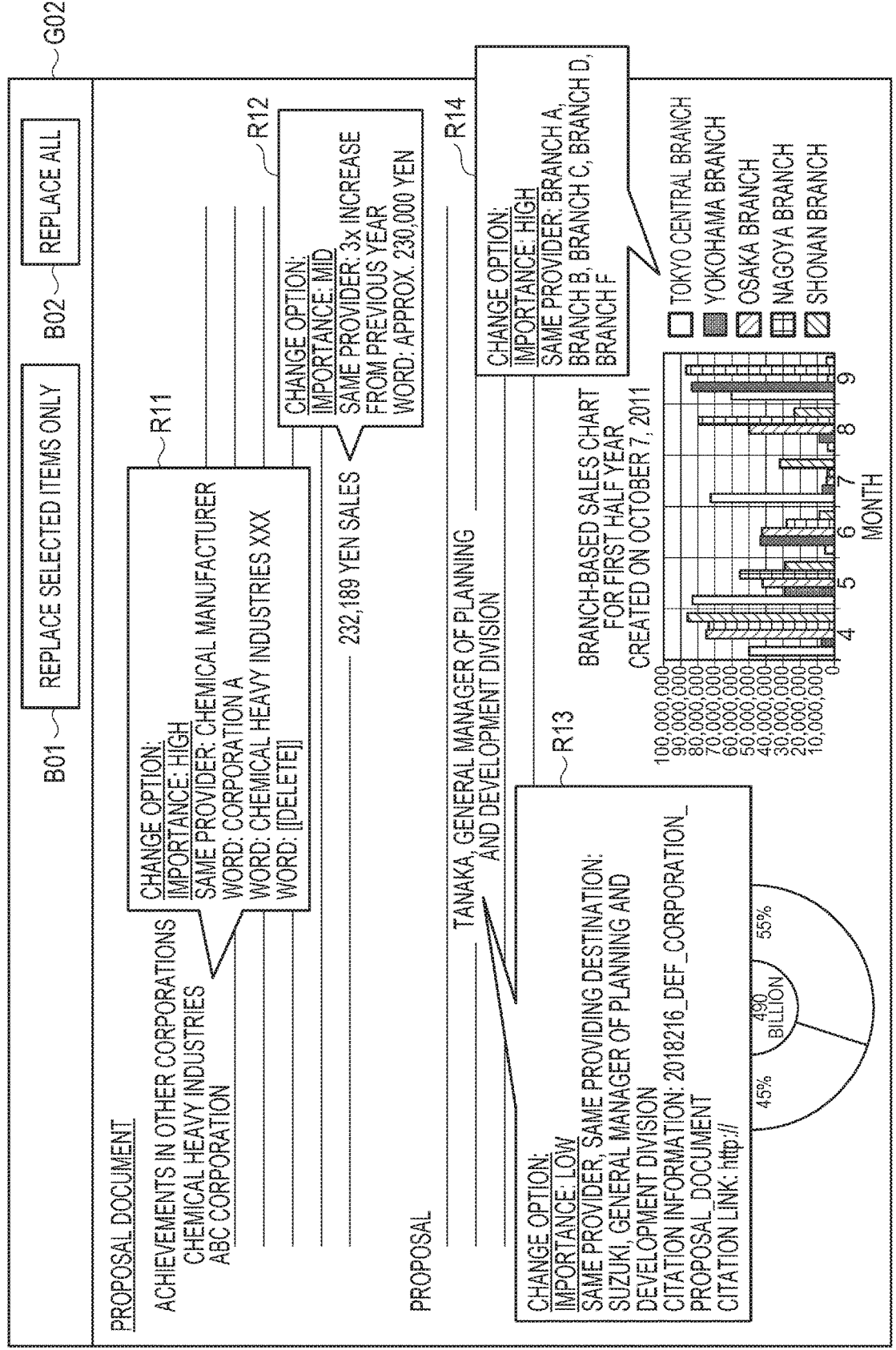
FIG. 10 illustrates a recommendation display example according to a first modification.

The change-information display control unit 1005 may cause the display on the client apparatus 20 to display change information together with how important each replacement suggested by the change information is (see FIG. 10 for recommendations R11 to R14 on the editing screen G02). The importance of a suggested replacement of an element may be determined by how frequently the suggested replacement was made (e.g., the number of occurrences of the replacement divided by the number of all occurrences of the element in the original document). One conceivable mode for displaying the degree of importance is displaying a numerical value of the frequency. Conceivable alternatives to this mode include changing the color of suggested replacements depending on the frequency (e.g., red for the frequency of 100%, blue for frequencies lower than 50%, and yellow for frequencies in-between), and displaying text that indicate the degree of importance depending on the frequency (e.g., "importance: high" for the frequency of 100%, "importance: low" for frequencies lower than 50%, and "importance: mid" for frequencies in-between). In the example shown in FIG. 10, text is used to inform the user of the degree of importance of each suggested replacement.

Moreover, the change-information display control unit 1005 may cause the display of the client apparatus 20 to display change information together with identification information that identifies a document after the replacement suggested by the change information was made (see FIG. 10 for recommendation R13 on the editing screen G02). This makes it easier to find an actual example document (referred to as "relevant information" hereinafter) after the replacement suggested by the change information was made. A specific example of the identification information includes a uniform resource identifier (URI) of the document which has a link that opens the document when clicked.

Figure 11:
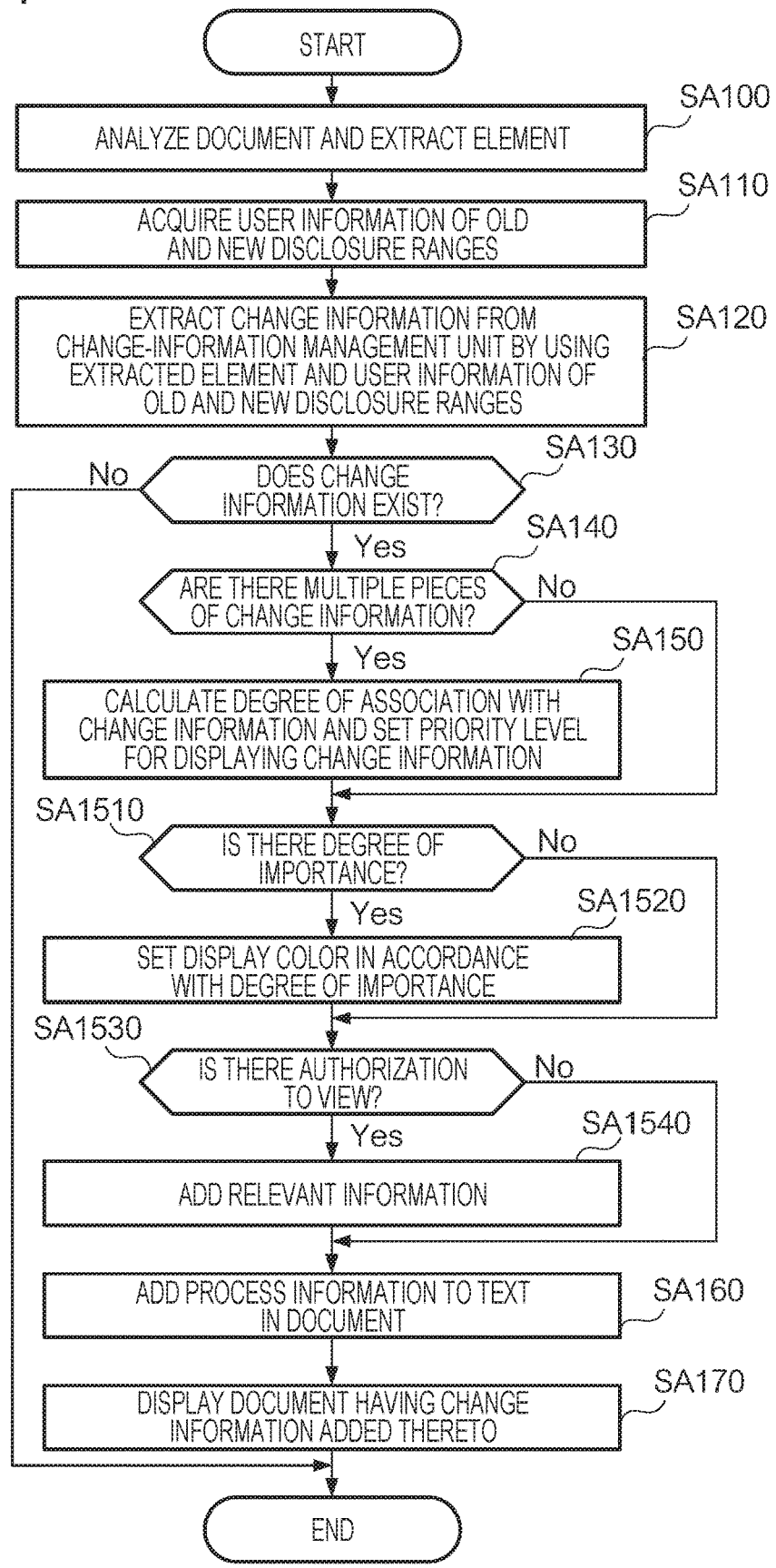
FIG. 11 is a flowchart illustrating the flow of a recommendation process according to the first modification.

To display the degree of importance and the relevant information on the client apparatus 2, the change-information display control unit 1005 may execute a recommendation process shown in FIG. 11 instead of the recommendation display shown in FIG. 6. In FIGS. 11 and 6, steps with identical processing contents are given the same reference numbers. As is seen from a comparison between FIGS. 11 and 6, the recommendation process according to this modification is different from the recommendation process according to the above exemplary embodiment in that the recommendation process according to this modification includes step SA1510 to step SA1540. Step SA1510 and step SA1520 are for indicating the degree of importance of the change information by the display color of the change information. Step SA1530 and step SA1540 are for displaying the relevant information.

In step SA1510, the change-information display control unit 1005 determines whether or not the degree of importance is given to the change information corresponding to the process element. If the determination result in step SA1510 indicates "YES", the change-information display control unit 1005 sets the display color to be used when displaying this change information based on the change information in step SA1520, and subsequently executes step SA1530. If the determination result in step SA1510 indicates "NO", the change-information display control unit 1005 executes step SA1530 without executing step SA1520.

In step SA1530, it is determined whether or not the new disclosure range of the disclosure document is authorized to view the relevant information. This is because, if the disclosure destination is not authorized to view the relevant information, it is meaningless to present the identification information indicating the relevant information to the user A since the user A is not capable of viewing the relevant information. If the determination result in step SA1530 indicates "YES", the change-information display control unit 1005 adds the identification information indicating the relevant information to the disclosure document in step SA150 and subsequently executes step SA160. If the determination result in step SA1530 indicates "NO", the change-information display control unit 1005 executes step SA160 without executing step SA1540.

Second Modification

Alternatively, the virtual operating part B02 may be omitted, and step SB100, step SB140, and step SB150 in FIG. 8 may be omitted, such that a process element only with regard to a recommendation selected by the user may be replaced. Although the user is caused to designate the disclosure destination of the disclosure document in the above exemplary embodiment, the designation of the disclosure destination may be omitted. In this case, the disclosure-range designating unit 1003 is not necessary. Furthermore, the document disclosing unit 1006, the difference extracting unit 1007, and the document changing unit 1008 are also omittable. This is because it is possible to cause the service apparatus 10 to execute the recommendation display process even if the document disclosing unit 1006, the difference extracting unit 1007, and the document changing unit 1008 are omitted. Moreover, although the storage unit 102 of the service apparatus 10 functions as the document management unit 1105, the operation-history recording unit 1106, the user management unit 1107, and the change-information management unit 1108 in the above exemplary embodiment, an external storage device accessible from the service apparatus 10 may alternatively function as these units. Specifically, the document management unit 1105, the operation-history recording unit 1106, the user management unit 1107, and the change information management unit 1108 are not necessary components of the information processing apparatus according to the exemplary embodiment of the present disclosure and are omittable.

Furthermore, although the service apparatus 10 is caused to execute the editing assistance process in the above exemplary embodiment, the client apparatus 20 may alternatively be caused to execute the editing assistance process, so long as the exemplary embodiment provides an information processing apparatus having an acquiring unit (i.e., the document acquiring unit 1001) that acquires a document designated by a user, a specifying unit (i.e., the disclosure-range identifying unit 1002) that specifies a range in which the document is currently disclosed, an extracting unit (i.e., the change-information extracting unit 1004) that extracts an expression changed when the document disclosed in the specified range is to be disclosed in a range different from the specified range, and a notifying unit (i.e., the change-information display control unit 1005) that notifies the user of the extracted expression in which an expression before or after the change is included in the document. Moreover, the service apparatus 10 and the client apparatus 20 may be caused to distributively execute the recommendation display process, the replacement process, and the difference extraction process, and the acquiring unit, the specifying unit, the extracting unit, and the notifying unit described above may be distributively provided in the service apparatus 10 and the client apparatus 20, so long as the exemplary embodiment provides an information processing system having the acquiring unit, the specifying unit, the extracting unit, and the notifying unit described above.

Third Modification

Although the function of the editing assistance process is realized by software in the above exemplary embodiment, some or all of the function may be realized by a hardware circuit. This software may be recorded in a computer readable recording medium, such as an optical recording medium or a semiconductor memory, and may be loaded and installed from the recording medium. Alternatively, the software may be provided via a telecommunication line.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   an acquiring unit that acquires a document designated by a user;
   an identifying unit that identifies a first disclosure range of the document;
   an extracting unit that extracts an expression change previously made to accommodate a disclosure range change from the first disclosure range to a second disclosure range, the expression change being stored in a storage unit;
   a change information display control unit calculates a degree of association between one element and each of a plurality of pieces of the expression change, wherein each of the plurality of pieces of the expression change associated with the element are displayed, the each of the plurality of pieces of the expression change are sorted based on priority level of each of the plurality of pieces; and
   a notifying unit that, if the document includes an expression before the expression change, notifies the user of the expression change.

2. The information processing apparatus according to claim 1, further comprising:
   a receiving unit that receives designation of a disclosure range from the user,
   wherein the extracting unit extracts an expression change previously made to accommodate a disclosure range change from the first disclosure range to the designated disclosure range.

3. The information processing apparatus according to claim 1,
wherein the notifying unit notifies the user of the expression change together with a past frequency of the expression change.

4. The information processing apparatus according to claim 1,
wherein the notifying unit provides a notification about identification information that identifies an example document after the expression change.

5. The information processing apparatus according to claim 1, further comprising:
a changing unit that changes the designated document in accordance with the notified expression in a case where a command is received from the user.

6. The information processing apparatus according to claim 1,
wherein the extracting unit extracts more than one expression change,
wherein the notifying unit provides a notification about the more than one expression change in such a manner that the more than one expression change is differentiated by who has made each of the more than one expression change.

7. An information processing system comprising:
a service apparatus and a client apparatus that communicate with each other via a communication line,
wherein the service apparatus includes at least one of
an acquiring unit that acquires a document designated by a user,
an identifying unit that identifies a first disclosure range of the document,
an extracting unit that extracts an expression change previously made to accommodate a disclosure range change from the first disclosure range to a second disclosure range, the expression change stored in a storage unit,
a change information display control unit calculates a degree of association between one element and each of a plurality of pieces of the expression change, wherein each of the plurality of pieces of the expression change associated with the element are displayed, the each of the plurality of pieces of the expression change are sorted based on priority level of each of the plurality of pieces, and
a notifying unit that, if the document includes an expression before the expression change, notifies the user of the expression change, and
wherein the client apparatus includes a remaining one or more of the acquiring unit, the identifying unit, the extracting unit, and the notifying unit.

8. The information processing apparatus according to claim 1,
wherein the priority level of each of the plurality of pieces are determined based on at least one of a plurality of conditions,
wherein the plurality of conditions comprises:
whether the element which is a target of the expression change is same or not as one of a past disclosure range change;
whether the first disclosure range is same or not as one of the past disclosure range change; and
whether the second disclosure range is same or not as one of the past disclosure range.

9. An information processing apparatus comprising:
an acquiring unit that acquires a document designated by a user;
an identifying unit that identifies a first disclosure range of the document;
an extracting unit that extracts an expression change previously made to accommodate a disclosure range change from a second disclosure range to the first disclosure range, the expression change being stored in a storage unit;
a change information display control unit calculates a degree of association between one element and each of a plurality of pieces of the expression change, wherein each of the plurality of pieces of the expression change associated with the element are displayed, the each of the plurality of pieces of the expression change are sorted based on priority level of each of the plurality of pieces; and
a notifying unit that, if the document includes an expression after the change, notifies the user of the expression change.

10. A non-transitory computer readable medium storing a program causing a computer to execute a process, the process comprising:
an acquiring unit that acquires a document designated by a user;
an identifying unit that identifies a first disclosure range of the document;
an extracting unit that extracts an expression change previously made to accommodate a disclosure range change from the first disclosure range to a second disclosure range, the expression change being stored in a storage unit;
a change information display control unit calculates a degree of association between one element and each of a plurality of pieces of the expression change, wherein each of the plurality of pieces of the expression change associated with the element are displayed, the each of the plurality of pieces of the expression change are sorted based on priority level of each of the plurality of pieces; and
a notifying unit that, if the document includes an expression before the expression change, notifies the user of the expression change.

* * * * *